C. F. HESS.
TIRE HOLDER.
APPLICATION FILED JUNE 22, 1914.
1,165,777.
Patented Dec. 28, 1915.
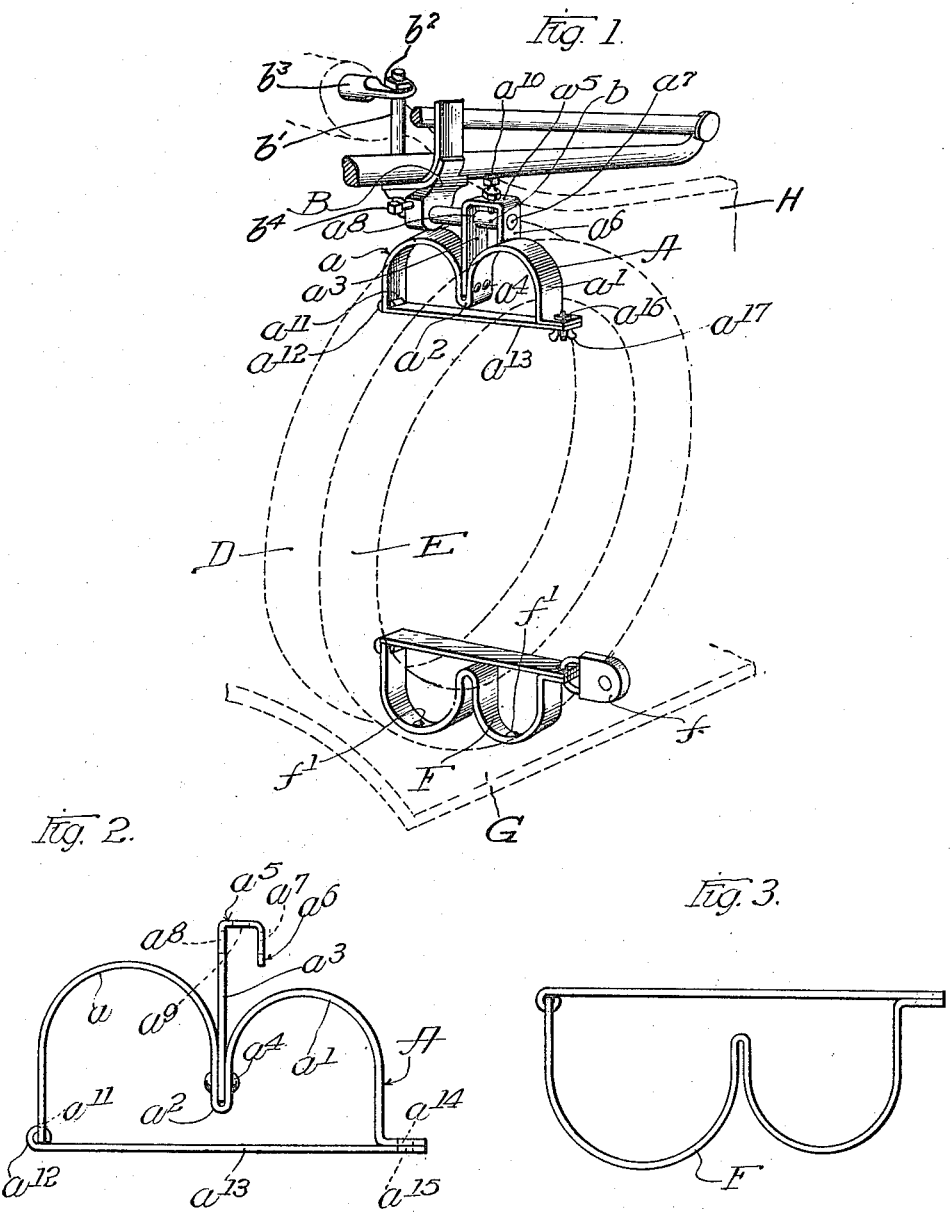

UNITED STATES PATENT OFFICE.

CHRISTIAN F. HESS, OF CHICAGO, ILLINOIS, ASSIGNOR TO ALEXANDER NELSON, OF CHICAGO, ILLINOIS.

TIRE-HOLDER.

1,165,777.

Specification of Letters Patent.

Patented Dec. 28, 1915.

Application filed June 22, 1914. Serial No. 846,482.

*To all whom it may concern:*

Be it known that I, CHRISTIAN F. HESS, a citizen of the United States of America, and resident of Chicago, Cook county, Illinois, have invented a certain new and useful Improvement in Tire-Holders, of which the following is a specification.

My invention relates to tire holders for automobiles.

It relates more especially to those in which two tires are held close together at one side of the automobile.

Again, and more specifically considered, it relates to tire holders for automobiles of the Ford runabout type or class.

The object of my invention is to provide a novel and comparatively inexpensive tire holder by which one or more tires may be held tightly in place at the side of the automobile, or in other suitable position, without the necessity of mutilating or disfiguring the construction of the automobile in any way, and without in any manner interfering with the proper use of the vehicle.

To these and other useful ends my invention consists in matters hereinafter set forth and claimed.

In the accompanying drawings Figure 1 is a perspective of an automobile tire holder embodying the principles of my invention, showing the two tires in dotted lines, and showing in full lines certain adjacent portions of the automobile. Fig. 2 is a side elevation of the upper tire holder. Fig. 3 is a side elevation of the lower tire holder.

As thus illustrated, my invention comprises a piece of strap iron A bent into shape to provide the two arches $a$ and $a^1$, the former being preferably somewhat higher and larger than the latter, whereby an extra front tire and an extra rear tire may be carried by the holder. A loop portion $a^2$ extends downwardly between these two arches and contains a vertically disposed piece of strap iron $a^3$ which latter is held in place by a rivet $a^4$ which extends through the three thicknesses of metal at this point. The upper end of the strap iron $a^3$ is bent to provide a horizontal portion $a^5$ and a depending portion $a^6$, the latter and the upper end of the portion $a^3$ being provided with openings $a^7$ and $a^8$, as shown more clearly in Fig. 1, whereby the holder is adapted to be supported in place. The portion $a^5$ is provided with a threaded opening $a^9$ for the set screw $a^{10}$, or for any other suitable fastening means. The outer lower end of the arch $a$ is provided with a slot $a^{11}$ through which is inserted the eye portion $a^{12}$ of the horizontal strap iron $a^{13}$, whereby the latter is adapted to swing downward when released. The lower outer end of the arch $a^1$ is turned outward and provided with an opening $a^{14}$, and the end of the strap iron $a^{13}$ is provided with a corresponding opening $a^{15}$, these openings being adapted to receive a bolt $a^{16}$ having a thumb nut $a^{17}$ applied to the lower end thereof, whereby the hinged strap iron $a^{13}$ is held firmly in its raised or holding position.

My invention contemplates the use of this holder on an automobile having what is ordinarily known as a bow support B for the carriage top, and it is for this purpose that the said holder is provided with the openings $a^7$ and $a^8$, the latter being adapted to receive the cylindric and outwardly projecting portion $b$ of the bow support bracket, the latter being found, for example, on the well known Ford runabout. When the holder is adjusted in position on the portion $b$, in the manner shown in Fig. 1, the set screw $a^{10}$ is then tightened to bring it into engagement with the said portion $b$, whereby the holder is held firmly in the position shown, it being understood that this bow support B is fastened to the side of the car body in any suitable or desired manner. Thus, and with my improved construction, no mutilation of the automobile structure is necessary in order to fasten the holder in place, means already in position thereon being suitable for this purpose. The tires D and E are held respectively in the arches $a$ and $a^1$ at one side of the car, being carried by the bow support bracket in the manner shown in Fig. 1, and in a way that will be readily understood. Down below the tires are held together by a holder F similar to the one already described, except that in this case the attaching portion $a^3$ is omitted, and instead of the screw $a^{16}$ and the nut $a^{17}$ a padlock $f$ is employed for locking the two parts together. In other ways, however, the holder F is similar to the one shown in Fig. 2, and is simply used upside down and with screws $f$ attaching it to any portion of the machine. Thus the two tires are held firmly at top and bottom without the necessity of inserting screws or bolts in the side of the automobile body, and without in any other way mutilating or disfiguring the same. As shown and described, the hanger $a^3$ has its upper portion formed to support the holder at the side of the automobile. Obviously, however, this hanger may be of any suitable form or shape and adapted for supporting the holder in any desired place or position on the automobile.

When it is desired to remove the tires, all that is necessary is to simply unlock the padlock $f$ and take out the bolt $a^{16}$, it being understood that this is possible without the necessity of removing the upper holder from the bow support bracket of the runabout or other machine. As shown, the holder F is attached to the running board of the machine.

The side H of the automobile can be of any suitable or well known character, and the running board G may be of the usual and well known form. In some automobiles the said running board is provided with openings which will be found adapted to receive the screws or bolts $f^1$, thereby avoiding the necessity of making special holes for this purpose. The bow support bracket B can be supported in any suitable manner, but in the automobile to which my invention is more particularly adapted for use, the said bracket is supported by an L-shaped rod, the lower portion of said rod being the stem $b$ previously described. The vertical portion $b^1$ of this rod is provided at its upper end with a nut $b^2$ for securing it to the supporting element $b^3$ on the side of the automobile. The bow support B is slidable back and forth on the projection or rod portion $b$ and is held in place thereon by a set screw $b^4$, in the usual and well known manner. Also, as shown and described, the holder A is slidable toward and away from the side of the automobile, on the rod portion $b$, and is held in place and against rotation thereon by the set screw $a^{10}$ inserted downward through the rigid hanger of said holder. Thus the two tires are held side by side on the running board, with their axes extending transversely of the said running board, and by means of upper and lower tire holders which extend transversely of and above said running board. Thus the bow support bracket supporting rod or projection serves also to support the upper tire holder, and in a manner that will not interfere with the free use of the said bow support for its primary or original purpose. With a tire holding arrangement of this character the tires are held in position at the side of the automobile, and no mutilation or changing of the structure of the automobile is necessary for the attachment of said devices.

I do not limit myself to the exact construction shown and described.

What I claim as my invention is:—

1. A tire holder comprising a strap bent to provide a pair of arches, having a loop between said arches, a hanger secured in said loop, a member hinged to one arch, and means for detachably securing the end of said member to the other arch.

2. A tire holder for an automobile comprising a strap bent to provide a pair of arches, having a loop between said arches, a hanger secured in said loop, a member hinged to one arch, and means for detachably securing the end of said member to the other arch, said hanger having an opening therein, and means including a device inserted through said opening to support said holder in position at the side of the automobile.

3. A tire holder comprising a strap bent to provide a pair of arches, having a loop between said arches, a hanger secured in said loop, a member hinged to one arch, and means for detachably securing the end of said member to the other arch, said hanger having an opening, means including a bow support bracket, which has a projection extending through said opening, and means for removably securing the hanger on said projection.

4. A tire holder comprising a strap bent to provide a pair of arches, having a loop between said arches, a hanger secured in said loop, a member hinged to one arch, and means for detachably securing the end of said member to the other arch, said hanger having a bent upper portion formed with two opposite openings, a bow support bracket having a projection extending through said openings, and a set screw in the top of said hanger engaging said projection.

5. In an automobile, and in combination with a bow support bracket therefor having a cylindric projection extending outward from the side of the automobile, a tire holder hung on said projection slidable thereon toward and away from the bow support bracket, and means for removably securing said holder in place and against rotation on said projection.

6. In combination with an automobile, a tire holder comprising a strap bent to form separate compartments for a plurality of tires, a retaining member for said strap, said member extending through the tires, said automobile having a running board below said holder, said holder extending transversely of said running board, thereby to hold the tires side by side above the running board and with their axes extending transversely thereof, said holder having two U-shaped portions resting on the running board, and fastening means extending through the running board and the bottom of each U-shaped portion.

7. In combination with an automobile, a tire holder comprising a strap bent to form separate compartments for a plurality of tires, a retaining member for said strap, said member extending through the tires, said automobile having a running board below said holder, said holder extending transversely of said running board, thereby to hold the tires side by side above the running board and with their axes extending transversely thereof, said holder having two inverted U-shaped portions, and supporting means engaging said portions to retain the holder above the tires.

Signed by me at Chicago, Illinois, this 8th day of June, 1914.

CHRISTIAN F. HESS.

Witnesses:
RACHEL J. RICHARDSON,
ROSE E. SEHNEM.

Copies of this patent may be obtained for five cents each, by addressing the "Commissioner of Patents, Washington, D. C."